United States Patent
Hatsch et al.

(10) Patent No.: US 9,043,157 B2
(45) Date of Patent: May 26, 2015

(54) DEVICE FOR THE COLLECTION AND PROCESSING OF INFORMATION RELATING TO THE EXPOSURE OF ONE OR MORE PERSONS TO ONE OR MORE PRODUCTS OF CHEMICAL OR BIOLOGICAL ORIGIN AND METHOD FOR THE USE OF SUCH A DEVICE

(75) Inventors: Didier Hatsch, Riom (FR); Pascual Perez, Chanonat (FR)

(73) Assignee: BIOGEMMA (FR)

( * ) Notice: Subject to any disclaimer, the term of this patent is extended or adjusted under 35 U.S.C. 154(b) by 1000 days.

(21) Appl. No.: 12/699,586

(22) Filed: Feb. 3, 2010

(65) Prior Publication Data
US 2011/0004410 A1    Jan. 6, 2011

(30) Foreign Application Priority Data

Jul. 1, 2009   (FR) ...................................... 09 03221
Jan. 26, 2010  (EP) ...................................... 10151717

(51) Int. Cl.
| | |
|---|---|
| *G01N 33/48* | (2006.01) |
| *G01N 31/00* | (2006.01) |
| *G06G 7/48* | (2006.01) |
| *G06G 7/58* | (2006.01) |
| *G06Q 10/06* | (2012.01) |

(52) U.S. Cl.
CPC ...................................... *G06Q 10/06* (2013.01)

(58) Field of Classification Search
CPC ..... G06Q 10/06; G06Q 50/22; G01N 1/2202; G01N 1/2211
See application file for complete search history.

(56) References Cited

U.S. PATENT DOCUMENTS

| | | | |
|---|---|---|---|
| 5,969,970 A | 10/1999 | Rhoades | |
| 6,234,343 B1* | 5/2001 | Papp | ................................ 221/7 |
| 2001/0048027 A1* | 12/2001 | Walsh | ............................ 235/385 |
| 2003/0105555 A1* | 6/2003 | Lunak et al. | .................. 700/237 |
| 2004/0128162 A1* | 7/2004 | Schlotterbeck et al. | .......... 705/2 |
| 2009/0243856 A1 | 10/2009 | Lee et al. | |

FOREIGN PATENT DOCUMENTS

| | | |
|---|---|---|
| FR | 2 872 315 | 12/2005 |
| JP | 2004 264161 | 9/2004 |
| WO | WO 2006 010833 A1 | 2/2006 |
| WO | WO 2006 018630 A2 | 2/2006 |
| WO | WO 2008 024471 A2 | 2/2008 |

\* cited by examiner

*Primary Examiner* — Larry D Riggs, II
(74) *Attorney, Agent, or Firm* — Cantor Colburn LLP

(57) ABSTRACT

A device for the collection and processing of information relating to the exposure of one or more persons to one or more products of chemical or biological origin has:
- at least one coded sensor for automatic or semi-automatic identification of a person likely to be exposed to at least one product,
- at least one coded sensor for the collection of information relating to the handling of at least one product by the person likely to be exposed to the product,
- at least one sensor for validating the information collected by the identification and collection sensors,
- at least one module for reading at least one coded sensor, and
- a module for processing information collected by the sensors.

13 Claims, 2 Drawing Sheets

Figure 1:
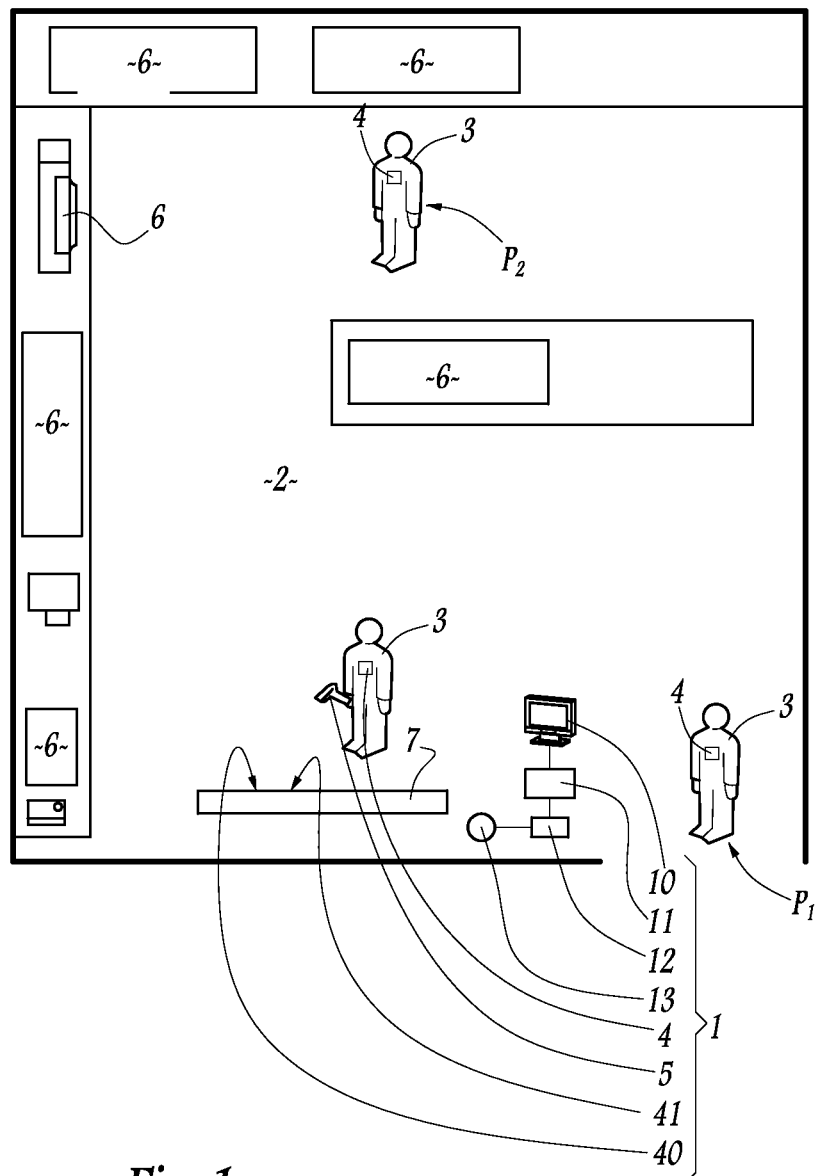

DEVICE FOR THE COLLECTION AND PROCESSING OF INFORMATION RELATING TO THE EXPOSURE OF ONE OR MORE PERSONS TO ONE OR MORE PRODUCTS OF CHEMICAL OR BIOLOGICAL ORIGIN AND METHOD FOR THE USE OF SUCH A DEVICE

This application is a U.S. national phase application filed pursuant to 35 U.S.C. §119 and claims priority to and benefit of French Patent Application No. 0903221, filed Jul. 1, 2009 and European Patent Application No. 10151717.5, filed Jan. 26, 2010.

The invention relates to a device for the collection and processing of information relating to the exposure of one or more persons to one or more products of chemical or biological origin. The invention also relates to a method for the use of such a device.

As a result of changes in regulations governing products used in industries and laboratories, every person who has used a product, notably if said product is considered to be hazardous, is monitored in order to be able to collect a minimum of information on said person's exposure to this product. In particular, French decree no. 2003-1254 of 23 Dec. 2003 stipulates that persons exposed to potentially hazardous chemical or biological products must be monitored, and that a form must be filled in for each of these persons, containing at least the name of the user, the nature and quantity of the product used, the frequency of exposure and the total exposure to the products.

The term "products" is understood to mean either products of chemical origin, for example, acids, bases, solvents, salts, radioactive products, gases, or products of biological origin, for example bacterial, viral, human, vegetable cultures or molecular compounds derived from living organisms, such as toxins or hormones. The data collected in this way enable the monitoring of a person's health and, advantageously, the recording of the history of this person's exposure to different products.

Currently, in certain companies or laboratories, an internal database exists which catalogues all of the products used in the company or laboratory. This database generally holds all of the procedures involving these products, i.e., for a given, standardized handling, the quantities of identified products used. Similarly, every user must regularly perform a manual input of the information relating to him. This information is added to an individual monitoring form. The manual input of the information takes time, is a potential source of error and does not enable any limitation of the risks of falsification of the information entered.

A method for managing the exposure of persons to hazardous gases is known from US-A-2004/0002160. This method enables a localization, via infrared, of a person, more precisely of a sensor carried by the person. This sensor is a chemical sensor which reacts to the presence of a given gas. The device enables the transmission of a warning message if a given threshold is exceeded. Statistics and/or the history of exposures of a person to a given gas can also be produced. One of the limitations of this technique is that one sensor only detects a given gas. Furthermore, these sensors are often only qualitative.

WO-A-2005/093680 enables a monitoring and check of a population to be carried out via a mobile telephony network, in particular to detect the emission of radiation and warn the population thereof. This also involves a qualitative detection of given products.

US-A-2004/0008115 describes a method for managing the time of exposure of one or more persons to hazardous products. A sensor, advantageously a chemical sensor, is used for this purpose. This sensor is connected to an exposure time recording device.

These methods are methods for the warning or for the collection of an exposure time, dedicated to one or, at best, a restricted number of products. In no case do they enable the collection of all of the data relating to the exposure of a person to different chemical or biological products, regardless of their form, and the production of an individual exposure monitoring form.

The invention is intended more particularly to overcome these disadvantages by proposing a device and its method of use, which, regardless of the products, of chemical or biological origin, enable the monitoring of the exposure of one or more persons to these products to be carried out.

For this purpose, the object of the invention is a device for the collection and processing of information relating to the exposure of one or more persons to one or more products of chemical or biological origin, comprising
  at least one coded sensor for automatic or semi-automatic identification of a person likely to be exposed to at least one product,
  at least one coded sensor for the collection of information relating to the handling of at least one product by the person likely to be exposed to the product,
  at least one sensor for validating the information collected by the identification and collection sensors,
  at least one module for reading at least one coded sensor,
  a module for processing information collected by the sensors.

The identification of the person and the products which he handles is thus performed in a simple and reliable manner thanks to the use of coded sensors. All of the collected information is also validated using a coded sensor.

According to advantageous but not mandatory aspects of the invention, a device of this type may incorporate at least one of the following characteristics:
  The device includes a data storage module.
  The device includes a module for transmitting the collected data.
  The validation sensors are adapted to validate, modify, supplement or cancel at least some of the information collected by the identification and information collection sensors.
  At least one of the coded sensors is a barcode.
  All of the coded sensors used are barcodes.

The invention also relates to a method for the use of a device according to one of the preceding characteristics, characterized in that it includes at least steps consisting in:
  a) an automatic or semi-automatic identification of every person likely to be exposed using a first coded sensor,
  b) a semi-automatic identification, using a second coded sensor, of one or more products of chemical or biological origin used by the person identified in step a),
  c) a verification during which at least some of the collected information can be validated, modified, supplemented or cancelled.

According to advantageous but not mandatory aspects, a method of this type may incorporate at least one of the following steps:
  in step c), the verification is carried out using a coded sensor by the person identified in step a).
  During step b), the identification relates to a handling operation including one or more products of a pre-defined quality and quantity.
  In step b), the identification relates to a single given product.

Before step a), a database is created which identifies all of the persons likely to use products.

Before step b), a database is created gathering all of the information relating to chosen products from a list of predefined products, and also handling operations including these products.

After step b), an additional step a) of identification of the person is carried out.

The order in which steps a) and b) is carried out is random.

Figure 2:
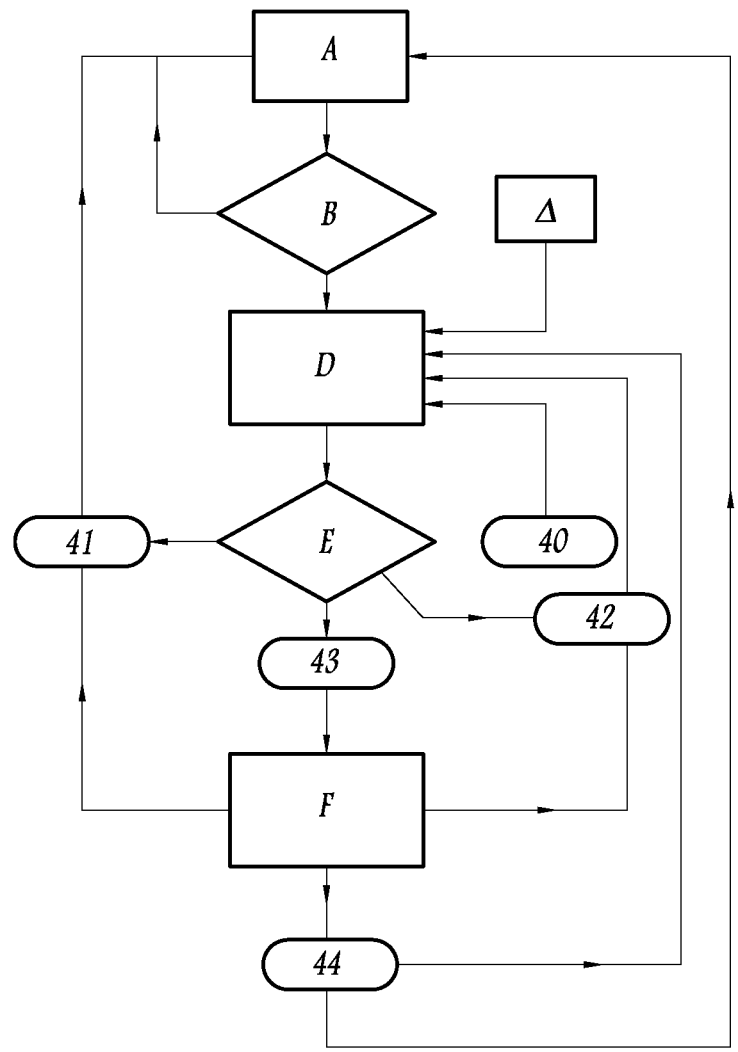

The invention will be better understood and other advantages of the invention will become clearer from a reading of the description which follows of a device and a method for the use of the device according to the invention, given only by way of example and with reference to the attached drawings, in which:

FIG. 1 is a schematic representation of a room equipped with workstations, a person handling products being shown in the different steps of information collection using a device and its method of use according to the invention, the device being shown schematically, and FIG. 2 is a diagram illustrating the different steps of a method of use of the device shown in FIG. 1.

The collection of information relating to the exposure of one or more persons to products of chemical or biological origin is described with reference to a device for the collection and processing of information. The order of the steps may be different from the order described, for example, the identification of the person using the products takes place after the identification of the products used.

The term "device for the collection and processing of information" is understood to mean either, as shown in FIG. 1, an assembly, designated as fixed, dedicated to a room and comprising sensors and modules connected to the internal computer system of the company or laboratory, or an assembly, designated as mobile, which can be moved between a plurality of locations. The use of a mobile device is advantageous in the case of a one-off operation, for example if chemical or biological analyses are to be carried out during a given, relatively short period.

A mobile device can also be used to validate information collected by other means, by way of control of a means for the collection of information relating to the exposure of persons to products of chemical or biological origin.

In FIG. 1, a fixed device 1 is installed in a room 2 where handling operations are carried out by a given user 3. In the example, the device 1 is connected to the computer system of the company or laboratory. The link is wired or wireless.

In a first step A, a user 3 is identified who is likely to be exposed to products used to carry out the catalogued handling operations in the room 2. This identification may be carried out through the manual input of a code. Advantageously, the identification is automatic or semi-automatic. For this purpose, the user 3 carries a first coded sensor 4.

The term "coded sensor" is understood to mean an automatic or semi-automatic, coded identification means enabling the collection of all of the data required for the identification of the person, without said person or a third party performing a manual input of the identification data. The term "automatic" is understood to mean an identification without any specific action on the part of the user. For example, the user passes through a gate or the like and a detector recognizes a sensor. The term "semi-automatic" is understood to mean an identification wherein the user carries out a specific action consisting in passing his sensor in front of a detector or reader which recognizes the sensor.

Advantageously, the coded sensor used is a barcode 4 printed on a badge worn by the user 3. In other words, a semi-automatic identification is involved, since the user passes the barcode in front of a reader. In one embodiment, which is not shown, this coded sensor is an electronic RFID label. This may also be an electronic chip, an optical sensor, a biometric identification device involving digital fingerprint or retina recognition, a voice recognition device or any coded means of identification.

To carry out the reading of the barcode 4, the user 3 passes his badge in front of a reading module 5 connected to the device 1. Advantageously, this module is a handheld, mobile, optical reader 5 known per se.

The information coded by the barcode 4 comprises, at least, an identifier of the user. This identifier is catalogued in an internal database of the company. Information, such as the name and the first name of the user, the name of the company to which he belongs and/or the department in which he works, is associated with this identifier. Other information can also be included in the identifier, for example the date on which the user 3 joined the company, periods of leave and/or sick leave. It is appropriate to update the identifier, while retaining the barcode 4, with each change in the person's situation.

The reading of the identification barcode 4 automatically generates the activation B of the device 1 and therefore the implementation of the method for the use of the device. This activation can possibly be visualized on a monitoring screen 10 or by other means, for example an audible warning device. In the event of an incorrect identification, it is possible, once the device 1 is in operation, to repeat an identification of the user. In other words, from the step B, it is possible to repeat a step A.

The identification barcode 4 of the user 3 advantageously comprises information relating to the control level which the user can access. In other words, each user can, to some extent, modify the collected information, whereby the authorized degree of modifications can be variable according to the persons.

An authentication of the user 3 by a coded sensor, in this case a barcode, avoids any manual input and the user does not need to memorize an identifier or password. In a variant, it is possible to associate the coded sensor with an identifier. The identifier may advantageously be associated with a password originating, for example, from the company's internal directory. In this case, the risk of a person using a coded sensor dedicated to a different person is limited, insofar as this sensor is not of a biometric sensor.

This first identification step is advantageously carried out when the user 3 enters the room 2, for example when he is in the position $P_1$, before any use and handling of chemical or biological products.

In one embodiment, which is not shown, the identification of the user is carried out after the handling of the products.

In a variant, the user 3 must identify himself on entering and leaving the room 2, i.e. before and after a handling operation. This avoids a situation, for example, wherein a user carries out a plurality of handling operations without identifying himself. During an identification on leaving the room, this identification advantageously comprises a signature validating the input information.

In the room 2, the user 3 carries out the handling operations provided for according to the predefined procedures and specifications. During these handling operations, the user 3 is located, for example, in the position $P_2$ at one of the workstations 6. If a plurality of persons are present in the room 2, the identification and information input steps are separate for each person so as to avoid any interference between the collected information.

Each procedure relates to a handling operation which may be carried out on a plurality of workstations 6. A procedure takes account of all of the products used, in both qualitative and quantitative terms, as well as their use.

Advantageously, each procedure is open, i.e. an internal company database cataloguing the procedures can be modified at any time by an administrator. This occurs, for example, if the supplier of a product is changed, if a given product has characteristics which have changed, if a procedure is modified or validated, or if a handling operation is removed or created.

The database also contains handling operations undergoing development and refinement, i.e. handling operations for which the procedure has not yet been finalized. These tests also result in an exposure of the user to the products and are therefore taken into account by the method. A special barcode can be provided to indicate that a procedure undergoing validation is involved. This barcode may be associated with the barcode of a procedure similar to the procedure undergoing validation.

The database also takes account of all of the chemical or biological products which are used in a uniform manner without a procedure. Use of a single product takes place, for example, when tests are carried out on a new product. The term "new" is understood to mean a product which has not previously been used in the catalogued handling operations. This involves, for example, a known product originating from a different supplier and/or with different characteristics.

The updating and input of information relating to the products in the database are carried out in a step Δ before the implementation of the method. This step Δ is carried out, insofar as possible, before a handing operation can be carried out by the user 3. In other words, any product likely to be used at a workstation 6 is first catalogued in the database in such a way that the user 3 only handles products which are referenced in the database.

This step Δ of updating the database is carried out manually, either by the user or by an administrator responsible for the database relating to the procedures and tested products. In a variant, it can be carried out using a barcode printed on the product packaging for semi-automatic identification.

If the user 3 has finished his handling operation(s), he carries out a step D which consists in taking account of the information relating to his exposure to the handled products. For this purpose, the user 3 identified in step A enters a barcode 40 using the reading module 5. In a variant, this may be a coded sensor of a different type, for example an optical sensor, an electronic RFID chip or a voice recognition means.

In a given room 2, a medium collects all of the barcodes 40 relating to the procedures and products used in this room. This medium is advantageously a wallboard 7 located close to the entrance to the room 2. In a variant, it involves a board disposed close to each workstation, listing the barcode(s) only of the handling operation(s) which can be carried out at the workstation concerned. In one embodiment, which is not shown, the board is replaced by a touchscreen.

Each procedure is individualized. Thus, the user 3 enters a procedure by entering a given barcode 40. He must also enter the number of times that he has carried out the handling operation in a given period, i.e. during his presence in the room 2. For this purpose, he either carries out a plurality of inputs, i.e. a plurality of passes of the reading module 5 in front of the barcode 40 relating to the procedure, or the barcode 40 of the procedure is read in a plurality of variants, each corresponding to a given number of iterations of the procedure, up to a maximum number of iterations of the handling operation. In a variant, a barcode 40 is provided for each procedure and is associated with secondary barcodes, each corresponding to a given number of iterations of the procedure.

The collection of information is carried out in a semi-automatic manner, simply by passing the barcode(s) in front of the reading module 5. In a variant, each workstation is equipped with a fixed reading module 5.

As previously indicated, the collected information, i.e. the identification of the person 3 in step A and the information relating to the handling of the products in step D, can be gathered in a different order. For example, the user identifies himself using a barcode only after the handling operation and the reading of the barcode relating to the procedure.

Advantageously, it is provided that all of the information collected by reading the barcodes must be validated so that the declaration of exposure of the user to the products is carried out and closed. This validation is advantageously carried out by the user 3. For this purpose, in a verification step E, the user 3 uses a different coded sensor, in this case a different series of barcodes 41 to 43.

A barcode 41 corresponds to a cancellation command. This barcode is used if all of the entered information is to be cancelled, for example because an error has occurred in the authentication of the person. In this case, the declaration of exposure to the products is reset and the step A of identification of the user and the step D of collecting data relating to the procedures and/or products must be restarted.

A different barcode 42 enables only the collection of information relating to the protocol and/or product to be restarted, for example if an error has occurred either in the procedure or in the number of handling operations carried out. During the verification step E, the information entered in the step A of updating the database relating to the products and procedures can also be verified.

A third barcode 43 indicates the end of the information collection, thereby advantageously generating, in the device 1, a summary report F of the entered information so that the user can visually verify it once more. On the basis of this summary report produced in step F, the user is also able to carry out a total cancellation or to restart only the information collection in step D using the codes 41 and 42 respectively.

A different barcode 44 enables validation of all of the declaration, i.e. confirmation of the summary report F before a different declaration sheet is possibly opened. This barcode 44 also serves as an electronic signature, advantageously when the user is identified following the collection of information relating to the products. If a different user 3 completes the new declaration, he then carries out step A. If the same user completes a new declaration for a different handling operation, he then carries out step D. The choice can be made, for example, using two different barcodes 44, or directly by reading a barcode 4 identifying a new user, or by reading a barcode 40 identifying a new procedure.

Other barcodes or additional commands can obviously be provided. In all cases, the complete set comprising all of the inputs and information collected during the different steps of identification of the user and collection of data relating to the procedure and also the control commands are stored in the memory of a data storage module, i.e. an electronic memory 11, in such a way that all of the information can be checked and any fraud can be avoided.

The device 1 also includes an information processing module 12. In other words, the device 1 includes a microcomputer connected to a barcode reading module 5. The information processing module 12 can be located remotely from the reading module. The wired or wireless link between the modules is provided by a data transmission module 13. The information processing module can be configured to carry out a time stamping, for example for each collected information element, each validated form or for any subsequent modification of the validated form.

In one embodiment, which is not shown, the processing module 12 generates alerts notifying, for example, the user 3 that he has entered a procedure n times, which is not technically possible during the given period, or that he has carried out a handling operation n times and has reached a predefined threshold for exposure to a hazardous product.

The device 1 may also be connected to an inventory control device, which is not shown. In this case, the module 12 generates an alert in the product control.

It is also possible to provide a transmission of information by the transmission module 13 to an administrator responsible for collecting all of the information relating to the exposure to the products and located outside the room 2. This administrator may be internal within the company or external, for example belonging to a prevention, health inspection or occupational health body. The administrator may be able, at least during a given period, to modify the validated information. In all cases, every modification is saved and time-stamped.

In the case of a mobile device 1, i.e. with a portable microcomputer connected to a portable barcode reading module, the latter can be connected at the end of the information collection period via a wired USB or wireless WiFi link to a fixed computer system. This fixed computer system is advantageously adapted to gather information collected by a plurality of mobile devices.

Statistical studies can easily be carried out which enable an exposure report to be drawn up for each company, room, person, team, workstation or product.

Personalized forms can be produced with a device of this type. These forms can be validated by the signature of a manager and/or the user for a given period, for example a week or a day. For each person, forms of this type advantageously include the name of the products to which said person has been exposed. The products are arranged, for example, in alphabetical order with a coding of the type of handling, i.e. if laboratory handling is involved, a preparation of a culture medium or solution. The form also includes the number of handling operations carried out during a given period, the total quantity of products to which the user has been exposed, expressed as a defined unit, the location of exposure and whether any accidents or incidents have occurred. The latter are indicated, for example, by a different colour on the form.

These forms are generated during a subsequent output step, which is not shown, on the basis of all of the information entered and validated by the code 44. These forms are generated at least once a year, on the occasion of the medical examination of each person in the company carried out by the occupational health services. They can also be generated on demand, for example when the person leaves the company, when the mobile device is used or at the end of each working day. A new form can then be prepared either by entering a new user during a new step A or by collecting information relating to a different procedure during a new step D in the case of the same user.

In the event of an incident or awareness of new risks linked to the use of a product, these forms enable clearer definition of the handling operations and measures to be put in place for each employee and/or company according to the exposures which have taken place and the risks incurred.

The invention claimed is:

1. A method for the use of a device for the collection and processing of information relating to the exposure of one or more persons to one or more products of chemical or biological origin, comprising:
at least one first coded sensor for automatic or semi-automatic identification of at least one of the persons, the person being self-identified and likely to be exposed to at least one of the products,
at least one coded sensor for the collection of information collected by the at least one of the persons and relating to the handling of the at least one product by the person likely to be exposed to the product,
at least one sensor for validating the information collected by the identification and collection sensors,
at least one module for reading at least one coded sensor, and
a module for processing information collected by the sensors,
wherein the method comprises:
a) an automatic or semi-automatic identification of every person likely to be exposed, during which every person likely to be exposed uses the first coded sensor,
b) a semi-automatic identification of one or more products of chemical or biological origin used by the person identified in step a) during which the person identified in step a) uses a second coded sensor, and
c) a verification during which at least some of the collected information can be validated, modified, supplemented or cancelled.

2. The method according to claim 1, wherein in step c), the verification is carried out using a coded sensor by the person identified in step a).

3. The method according to claim 1, wherein in step b), the identification relates to a handling operation including one or more products of a predefined quality and quantity.

4. The method according to claim 1, wherein during step b), the identification relates to a single given product.

5. The method according to claim 1, wherein before step a), a database is created which identifies all of the persons likely to use products.

6. The method according to claim 1, further comprising a list of predefined products and the predefined products comprising chosen products,
wherein before step b), a database is created gathering all of the information relating to the chosen products from the list of predefined products, and also handling operations including these products.

7. The method according to claim 1, wherein after step b), an additional step a) of identification of the person is carried out.

8. The method according to claim 1, wherein the order in which steps a) and b) is carried out is random.

9. A method for the collection and processing of information relating to the exposure of at least one person to at least one product of chemical or biological origin by use of a device comprising:
at least one first coded sensor for automatic or semi-automatic identification of at least one of the persons, the person being self-identified and likely to be exposed to at least one of the products,
at least one coded sensor for the collection of information collected by the at least one of the persons and relating to the handling of the at least one product by the person likely to be exposed to the product,
at least one sensor for validating the information collected by the identification and collection sensors, at least one module for reading at least one coded sensor, and a module for processing information collected by the sensors, wherein all steps of the method are performed on the device, the method comprising:

identifying the at least one person likely to be exposed to the at least one product of chemical or biological origin, generating a control level for the at least one person to determine access to the at least one product, and verifying exposure of the at least one product accessible to the at least one person.

10. The method according to claim 9, wherein the identification of the at least one person is automatic or semi-automatic.

11. The method according to claim 9, wherein the control level can be modified.

12. The method according to claim 9, wherein verification of exposure of the at least one product to the at least one person is validated, modified, supplemented or cancelled.

13. The Method according to claim 9, further comprising:

generating a database identifying the at least one product and the at least one person exposed to the product.

* * * * *